(12) United States Patent
Whitaker

(10) Patent No.: US 11,834,312 B2
(45) Date of Patent: Dec. 5, 2023

(54) METHOD AND SYSTEM FOR MONITORING A CONTAINER FULLNESS COMPRISING A LIFT MECHANISM TO MODY THE WORKING DEPTH OF THE CONTAINER

(71) Applicant: Intrinsic Innovation LLC, Mountain View, CA (US)

(72) Inventor: Lucas Whitaker, Union City, CA (US)

(73) Assignee: Intrinsic Innovation LLC, Mountain View, CA (US)

( * ) Notice: Subject to any disclaimer, the term of this patent is extended or adjusted under 35 U.S.C. 154(b) by 0 days.

(21) Appl. No.: 18/109,699

(22) Filed: Feb. 14, 2023

(65) Prior Publication Data

US 2023/0192459 A1  Jun. 22, 2023

Related U.S. Application Data

(62) Division of application No. 17/375,875, filed on Jul. 14, 2021, now Pat. No. 11,591,194.

(60) Provisional application No. 63/051,832, filed on Jul. 14, 2020, provisional application No. 63/069,273, filed on Aug. 24, 2020.

(51) Int. Cl.
| | | |
|---|---|---|
| *B25J 9/16* | (2006.01) | |
| *B66F 7/06* | (2006.01) | |
| *G01F 23/292* | (2006.01) | |
| *B65B 35/10* | (2006.01) | |
| *B65B 57/14* | (2006.01) | |
| *G01V 8/10* | (2006.01) | |

(52) U.S. Cl.
CPC .............. *B66F 7/065* (2013.01); *B65B 35/10* (2013.01); *B65B 57/14* (2013.01); *G01F 23/292* (2013.01); *G01V 8/10* (2013.01)

(58) Field of Classification Search
CPC ......... B25J 9/00; B25J 3/04; B25J 9/16; B25J 15/00; B65B 1/30; B66F 7/06; B66F 7/00
USPC ................................................ 250/221, 239
See application file for complete search history.

(56) References Cited

U.S. PATENT DOCUMENTS 7,217,076 B2 * 5/2007 Bonora ............. H01L 21/67766
414/217.1

\* cited by examiner

*Primary Examiner* — Que Tan Le
(74) *Attorney, Agent, or Firm* — Fish & Richardson P.C.

(57) ABSTRACT

The system can include: a container no, a set of sensors 120, and a controller 130. The system can optionally include a robot 140. However, the system 100 can additionally or alternatively include any other suitable set of components. The system functions to monitor and/or maintain a fullness level of a container. The system can additionally or alternatively function to enable robotic picking out of the container (e.g., in a pick-and-place setting). The system can additionally function to maintain candidate objects within reach of the robot's end effector to increase robot uptime while minimizing the extent of the robot's required motion (e.g., in the z-axis).

18 Claims, 14 Drawing Sheets

METHOD AND SYSTEM FOR MONITORING A CONTAINER FULLNESS COMPRISING A LIFT MECHANISM TO MODY THE WORKING DEPTH OF THE CONTAINER

CROSS REFERENCE TO RELATED APPLICATIONS

This application is a divisional of U.S. patent application Ser. No. 17/375,875 filed Jul. 14, 2021, which claims the benefit of U.S. Provisional Application No. 63/051,832, filed 14 Jul. 2020 and U.S. Provisional Application No. 63/069,273, filed 24 Aug. 2020. The disclosures of the prior applications are herein incorporated by reference in their entirety.

TECHNICAL FIELD

This invention relates generally to the robotics field, and more specifically to a new and useful method for monitoring a container fullness in the robotics field.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview

Figure 1:
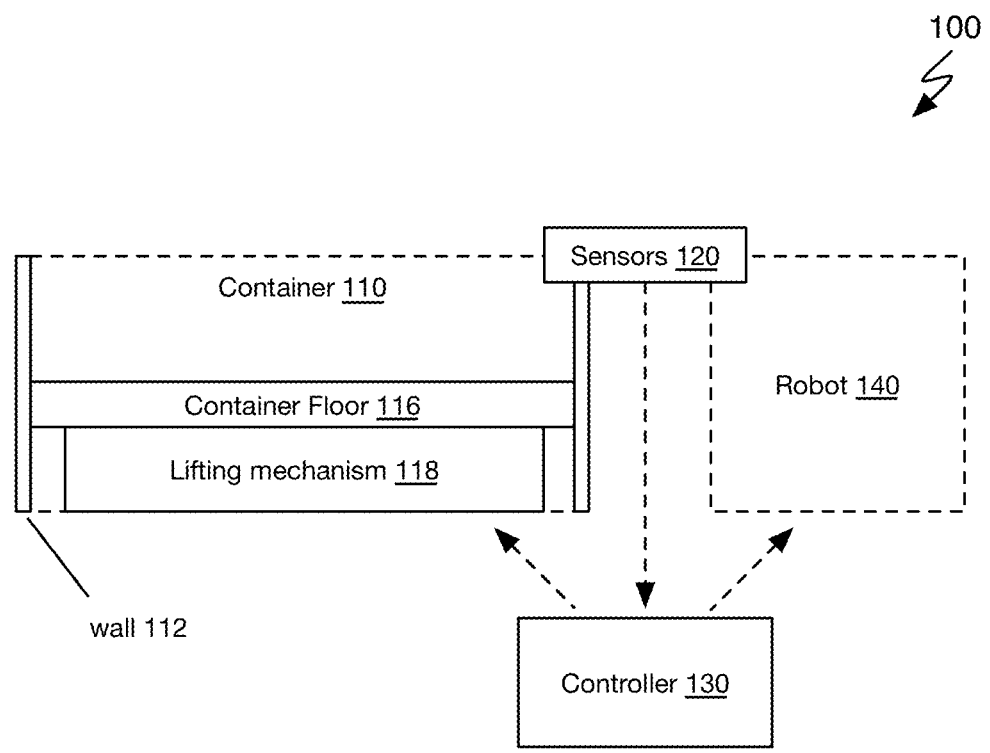
FIG. 1 is a schematic representation of a variant of the system.

The system 100, an example of which is shown in FIG. 1, can include: a container 110, a set of sensors 120, and a controller 130. The system can optionally include a robot 140. However, the system 100 can additionally or alternatively include any other suitable set of components. The system functions to monitor and/or maintain a fullness level of a container. The system can additionally or alternatively function to enable robotic picking out of the container (e.g., in a pick-and-place setting). The system can additionally function to maintain candidate objects within reach of the robot's end effector to increase robot uptime while minimizing the extent of the robot's required motion (e.g., in the z-axis).

Figure 2:
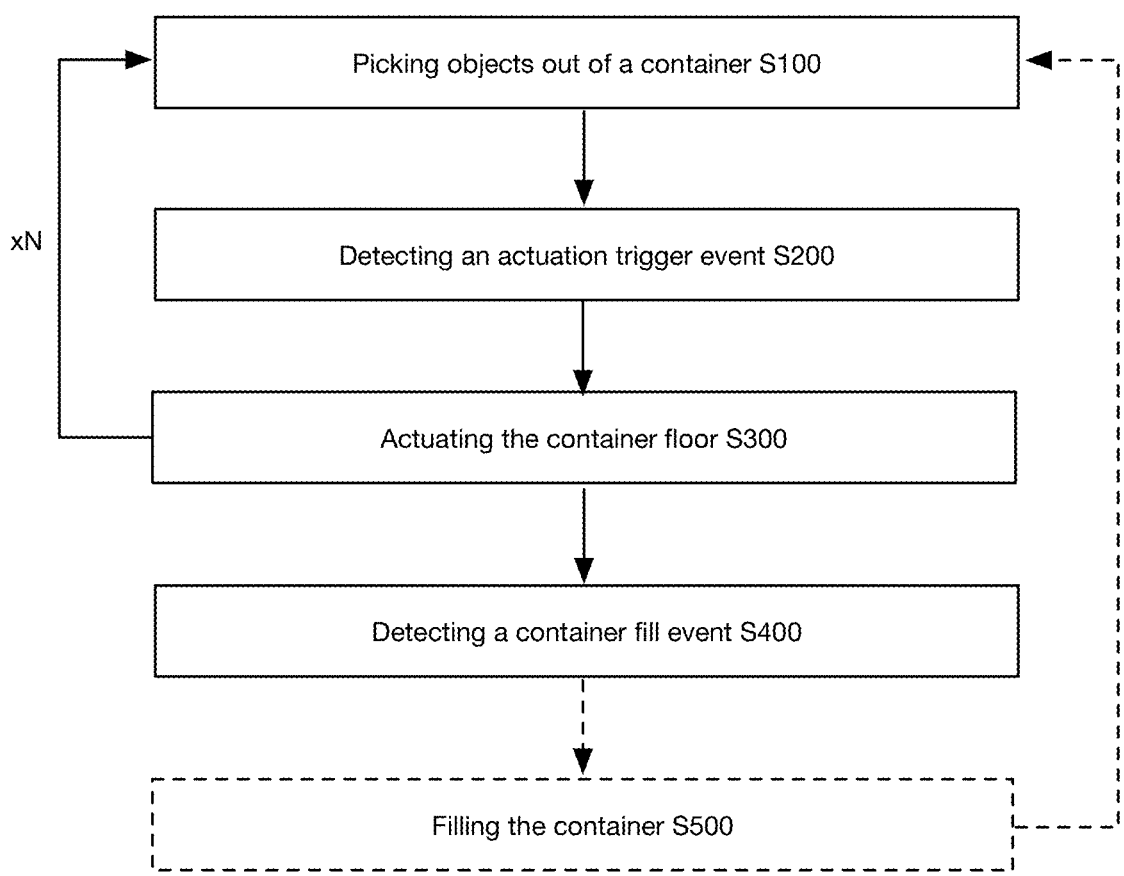
FIG. 2 is a schematic representation of the method.

As shown in FIG. 2, the method preferably includes picking objects out of a container S100, detecting an actuation trigger event S200, actuating the container floor S300, and detecting a container fill event S400, but can additionally or alternatively include filling the container S500, and/or any other suitable elements.

The system and/or method can be used in: box-packing applications, container filling applications, pick-and-place applications, and/or any other suitable application.

2. Examples

In a first example, as objects are picked out of a container, causing the object level to drop below a predetermined threshold, a container floor can be raised to maintain a constant object level (e.g., maintain a constant grasp surface) from which to pick objects. The floor can be iteratively raised as the robot removes objects, until a container fill event is detected (e.g., the robot is unable to pick an object), at which point the container is refilled (e.g., manually or automatically). After the container is refilled, the robot can resume picking objects from the container (e.g., as depicted in FIG. 2).

In a specific example, after container fill event detection, the robot can pick objects from a different container while the empty container is being filled.

3. Benefits

The method can confer several benefits over conventional systems.

First, the system and method enable a fullness level of a container to remain within a workspace of a robot arm and/or within a predetermined distance of the robot end effector during an operation session by monitoring the fullness level and shrinking the container's working volume (e.g., by raising the container floor) when the fullness level falls below a threshold. This can enable robots to pick objects faster and/or more consistently because the robot can plan for shallow and/or more consistent grasping depths rather than for the entire container volume.

Second, variants can provide a reduced frequency of container fill/switching operations in bin-picking applications (e.g., for a robotic pick-and-place system) by providing an increased container volume. Such variants can increase robot uptime by reducing a frequency of human-bin interactions, which can necessitate slowing or stopping a robot arm. Variants can further provide an opportunity for rapid line-change operations, since a large volume of objects can be swapped in a single container/operation (e.g., whereas line-change operations can often involve replacing multiple object containers or clearing a conveyor system, etc.).

Third, variants can reduce a container infrastructure and required footprint (e.g., floor area, portion of conveyor line length) dedicated to object containers/storage, such as by utilizing a greater portion of vertical space below a height of a robot arm platform and/or utilizing storage space beyond (e.g., below) the workspace of a robotic arm. Further, variants can provide a scalable storage volume, since containers can be efficiently transported (e.g., by rolling, palletization, etc.) without being weight/volume limited by a single-operator lifting requirements (e.g., which may be less than 50 lbs, less than 150 lbs, less than 160 lbs, etc.). In some variants, the container can additionally be utilized for long term storage within the picking bin (e.g., in a job-shop setting, for manual picking applications).

However, the method and system can confer any other suitable benefits.

4. System

The system 100, an example of which is shown in FIG. 1, can include: a container 110, a set of sensors 120, and a controller 130. The system can optionally include a robot 140. However, the system 100 can additionally or alternatively include any other suitable set of components. The system functions to monitor and/or maintain a fullness level of a container. The system can additionally or alternatively function to enable robotic picking out of the container (e.g., in a pick-and-place setting). The system can additionally function to maintain candidate objects within reach of the robot's end effector to increase robot uptime while minimizing the extent of the robot's required motion (e.g., in the z-axis).

The robot 140 functions to pick objects out of the container using an end effector 142. The robot can additionally or alternatively function to place the objects from the container onto a surface outside of the container (e.g., a conveyor, a secondary container, etc.). The robot can be articulated by automatic control and/or can be configured to automatically execute control instructions from the controller, however the system can alternatively be otherwise suitably controlled and/or otherwise suitably enable end effector articulation. The robot is preferably a multi-axis robot which includes at least three actuation mechanisms which function to transform the end effector along a corresponding set of axes (e.g., degrees of effector freedom). The robot can include three degrees of freedom, six degrees of freedom, seven degrees of freedom, and/or any other suitable degrees of freedom. In a first variant, the robot can include a robotic arm (such as a 6-axis robotic arm). The robotic arm can include any suitable number of joints which enable articulation of the end effector in a single degree of freedom (DOF). A robotic arm preferably includes 6 joints (e.g., a 6-axis robotic arm), but can additionally or alternatively include seven joints, more than seven joints, less than six joints, and/or any other suitable number of joints. In a second variant, the robot can include a CNC gantry system.

The robot can include and/or be used with an end effector 142 which functions to grip an object (i.e. pick an object out of the container). The end effector can be impactive, ingressive, astrictive, contigutive, and/or any other suitable type of end effector. In a first example, the end effector is a suction gripper. In a second example, the end effector is a claw gripper (e.g., dual prong, tri-prong, etc.). The end effector can be actuated: electrically (e.g., servo or motor actuation), pneumatically, hydraulically, unactuated (e.g., passive deformation based on motion of robot, rigid body, etc.), and/or otherwise actuated. However, the system can include any other suitable end effector. However, the end effector can be otherwise configured.

The robot and/or end effector can define a workspace, which can be taken as all points (poses) which are reachable by the end effector. The workspace can be defined as a 3D volume (e.g., points in cartesian space, dexterous workspace), in terms of joint poses (e.g., for a robotic arm), as a 2D surface/boundary, and/or can be otherwise suitably defined. In variants, the workspace may be a physically observable characteristic of a robot and/or may be manufacturer specified based on a range of motion of various axes therein. However, the robot and/or end effector can define any other suitable workspace.

Figure 9:
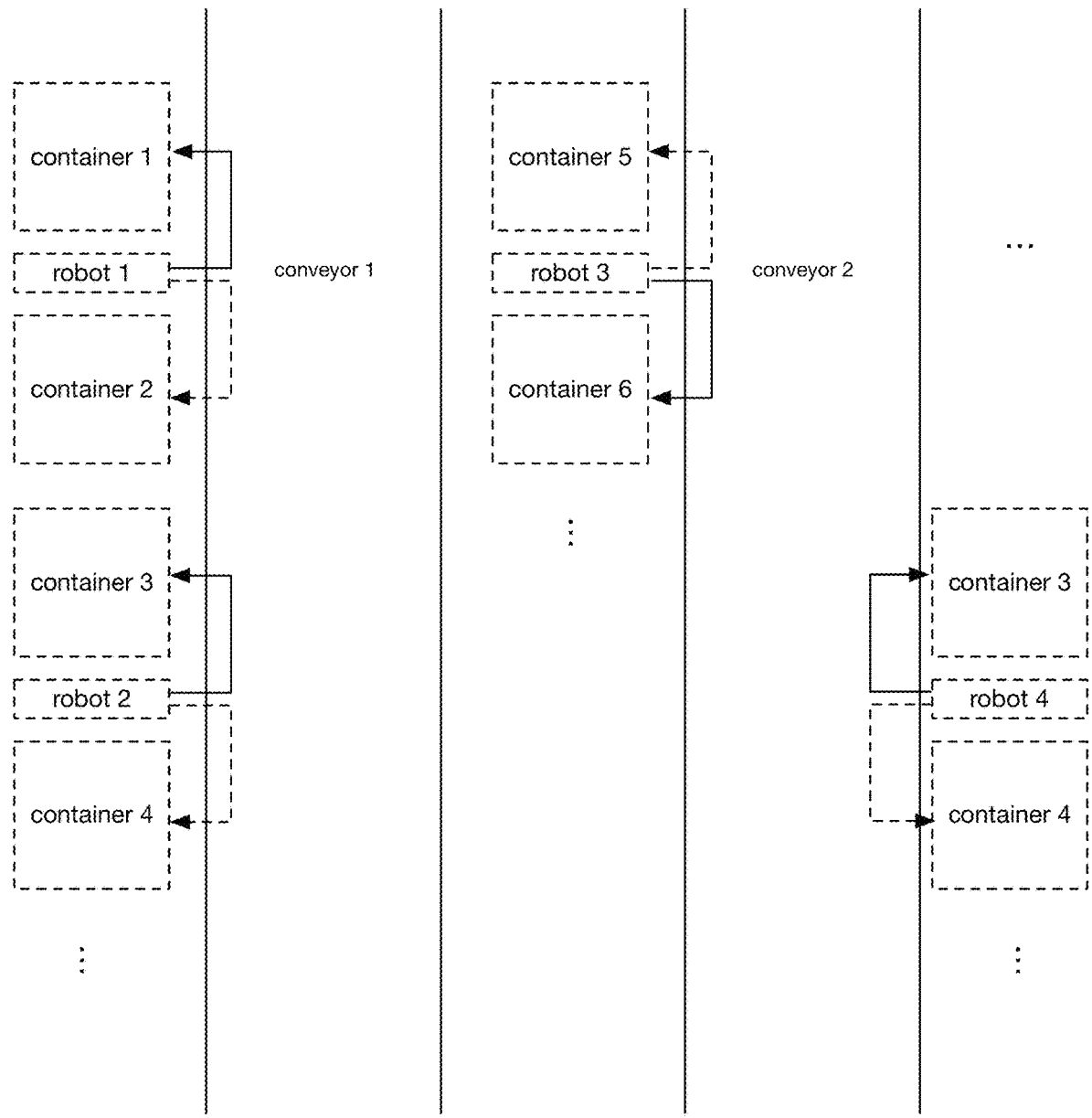
FIG. 9 depicts an embodiment of the system.
Figure 10:
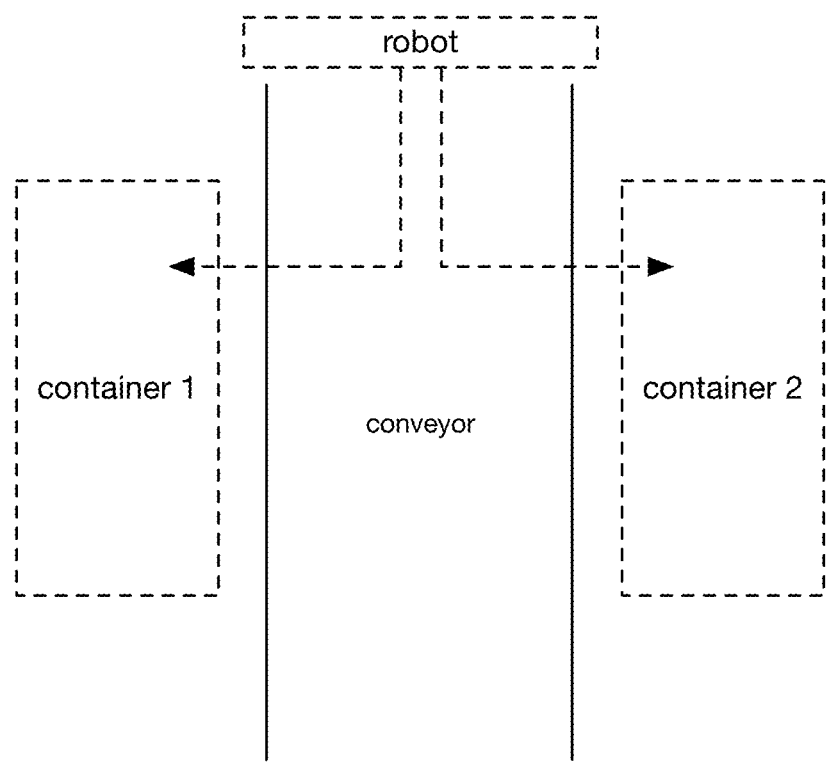
FIG. 10 depicts an embodiment of the system.

The robot can be positioned next to the container (e.g., depicted in FIG. 9), above the container (e.g., as depicted in FIG. 10), and/or otherwise positioned relative to the container such that the workspace of the robot intersects interior working volume of the container (i.e. the robot can pick objects from the container). The robot can be side-mounted (e.g., mounted to a wall or a side of a super-structure proximal to the container), top-mounted (e.g., hanging; mounted to a superstructure above the container), base-mounted (e.g., disposed on a floor; mounted to a platform adjacent to the container), and/or otherwise suitably arranged. Preferably, the base of the robot is mounted to a platform which is substantially planar with the top (e.g., lip) of the container (e.g., coplanar; parallel with a height difference within 6 inches, within 4 inches, within 1 inch, etc.). However, the robot can be otherwise arranged.

However, the system can include any other robot. The system can otherwise be used with a robot and/or exclude a robot altogether (e.g., when configured for manual operation; in a manual operation mode).

The container 110 can include: a set of walls 112, a frame 114, a container floor 116, and a lifting mechanism 118. The container can optionally include a frame 114 and a bezel 104. The container preferably functions to hold/house objects that can be picked by the robot.

Figure 4:
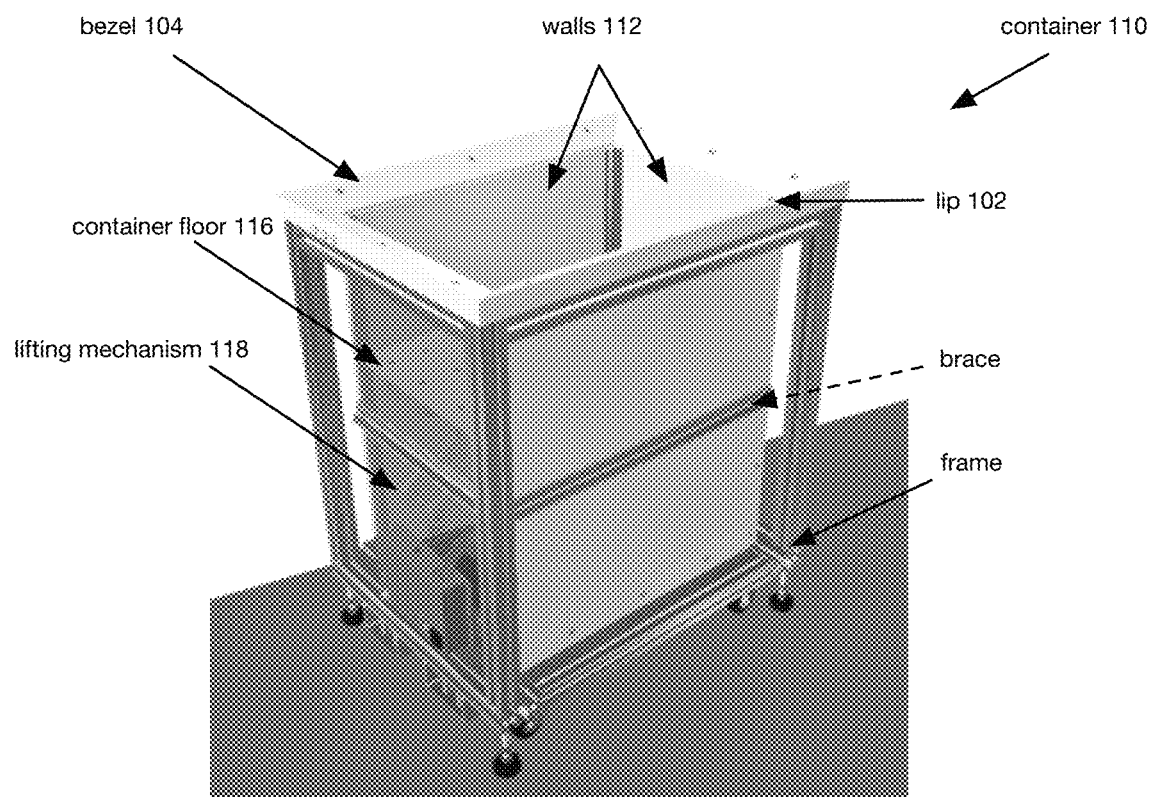
FIGS. 4-8 depict examples of the system.
Figure 5:
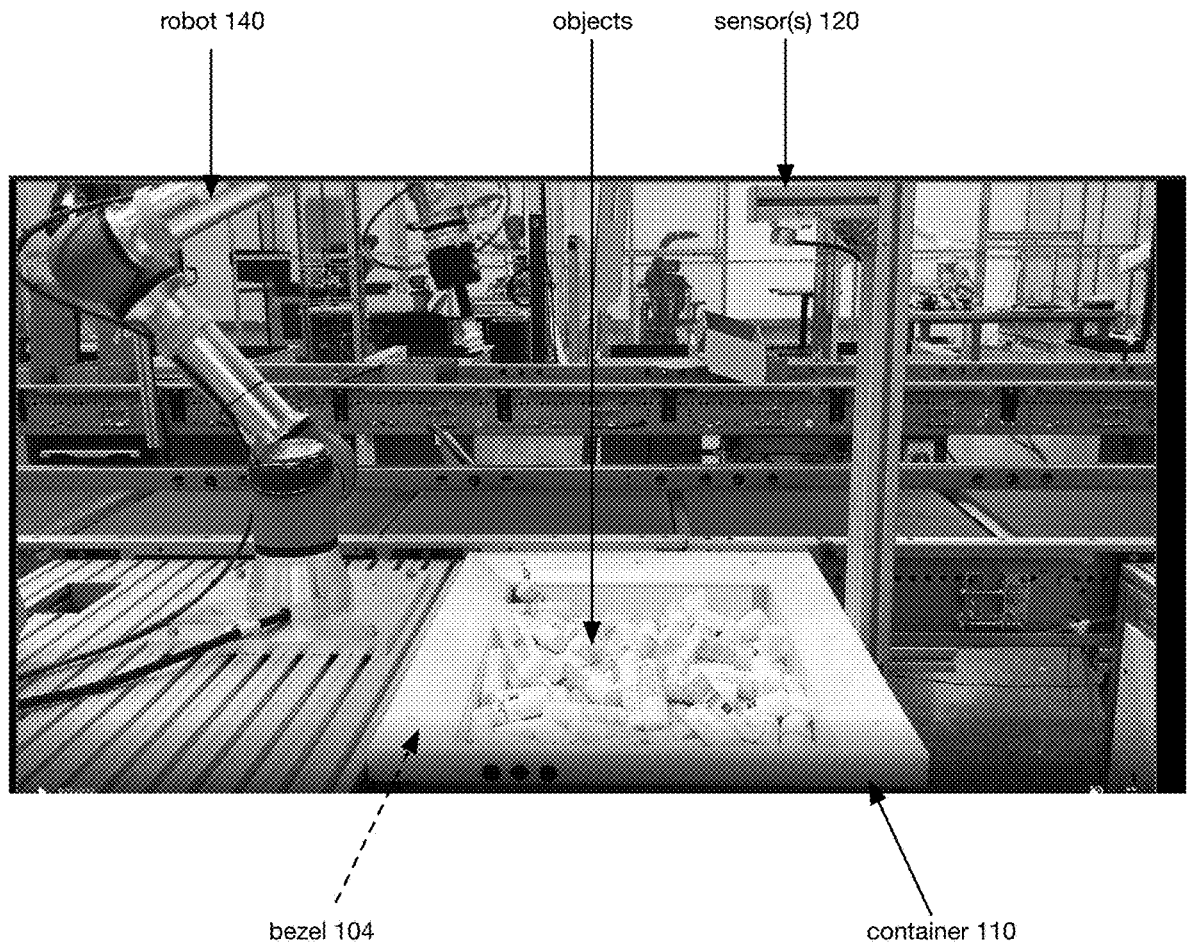

Objects within the container can define a fullness level. The fullness level preferably approximates a plane, but can additionally or alternatively have local concave and/or convex deformities. The fullness level can be determined as: the height or depth of the topmost object in the pile; the average or median height (or depth) of the topmost objects (e.g., non-occluded objects, highest n objects, etc.); height or depth (absolute, average, or median) of the topmost graspable objects; or otherwise determined. Examples of the container are depicted in FIGS. 4-5.

Figure 3:
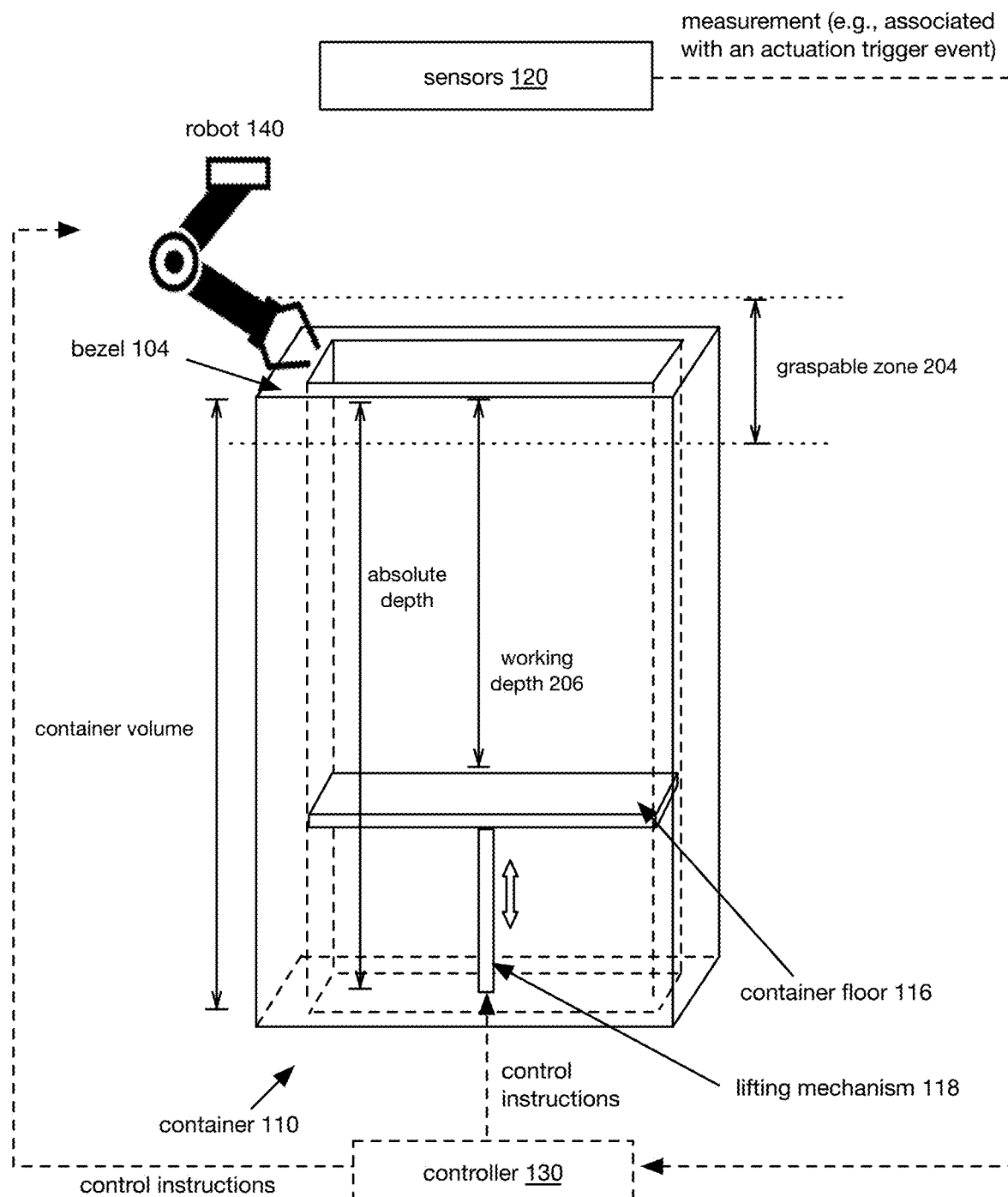
FIG. 3 depicts a variant of the system.
Figure 14:
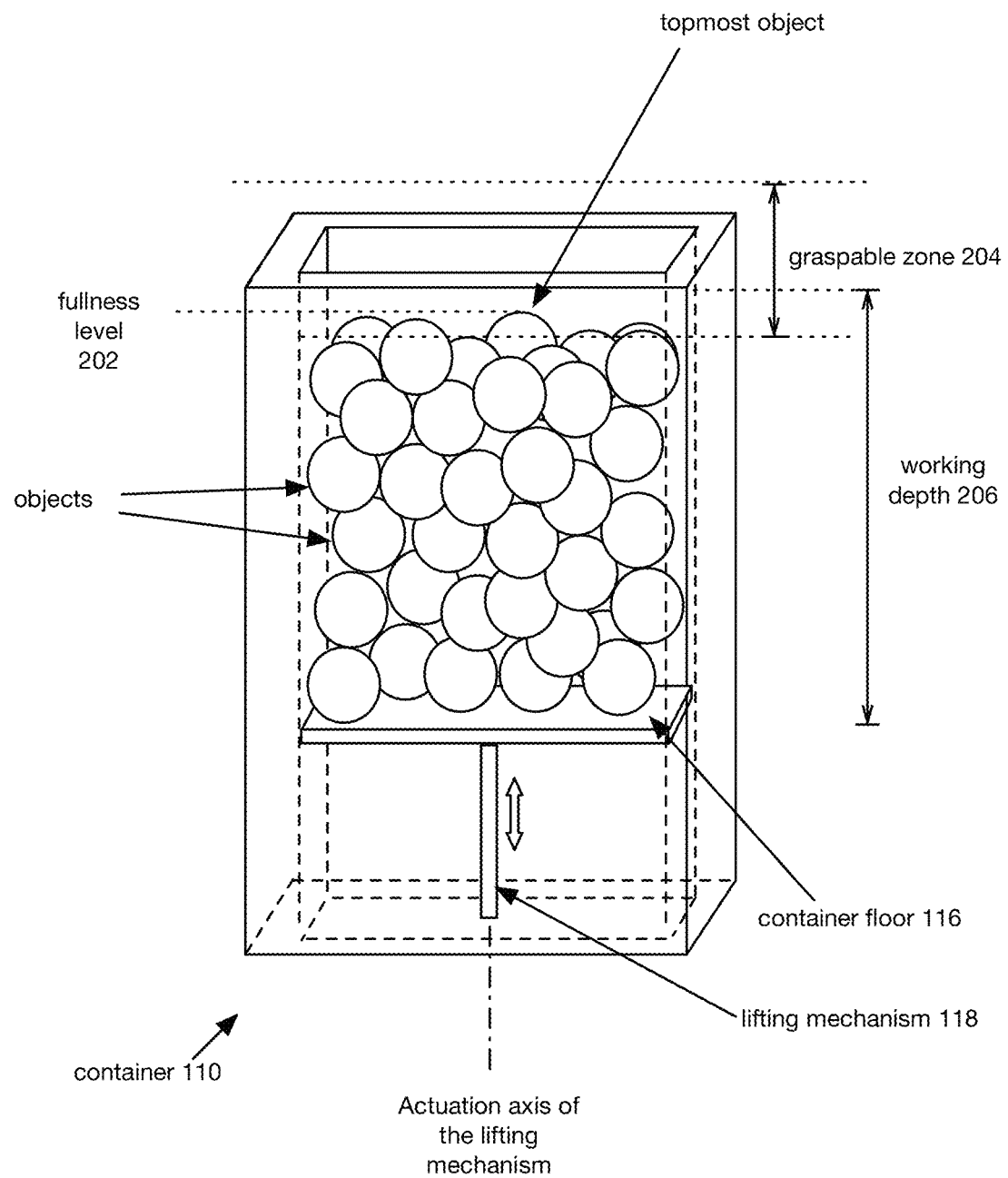
FIG. 14 is a schematic example of a variant of a container of the system.

The system can define a graspable zone (e.g., volume that is accessible to the robot), where the system preferably maintains the object level within the graspable zone's boundaries (an example is shown in FIG. 14). The boundary (ies) (e.g., lower boundary) of the graspable zone can be determined based on robot constraints (e.g., workspace, vision constraints, grasping constraints, robot joint constraints, etc.), based on an optimization for a particular task/application (e.g., efficiency optimization for a particular object type), manually determined, based on an arrangement of a sensor (e.g., vertical position of a light emitter-detector pair, such as a break-beam sensor or light curtain) or otherwise determined. In a first variation, the graspable zone is a two-dimensional surface (e.g., the graspable zone top and bottom boundaries are the same plane). In a second variation, the graspable zone is defined between a top and bottom plane (e.g., defining the maximum and minimum object level). In a third variation, the graspable zone is defined as a 3D volume with a top, bottom, and sides. However, the graspable zone can be otherwise defined. The graspable zone is preferably defined relative to the container (e.g., be a predetermined depth from the top of the container), but can alternatively be defined relative to the robot end effector or other robot component, or be otherwise defined. The graspable zone height is preferably static (e.g., 1 ft, 1 m, etc.), but can be dynamically determined. The graspable zone height can extend above the height of the container (e.g., when the container is overfilled), can be flush with a container opening/lip, recessed relative to the container opening (e.g., base of bezel, below bezel, etc.) or otherwise arranged. The graspable zone length and width can be equal to the length and width of the container, but can alternatively be less than the length and width of the container (e.g., to increase object grasp successes by increasing space between a robot end effector performing the object grasp and a container wall) or otherwise dimensioned. Variants of the graspable zone are depicted in FIG. 3. However, the graspable zone can additionally or alternatively include any other suitable characteristics.

Figure 6:
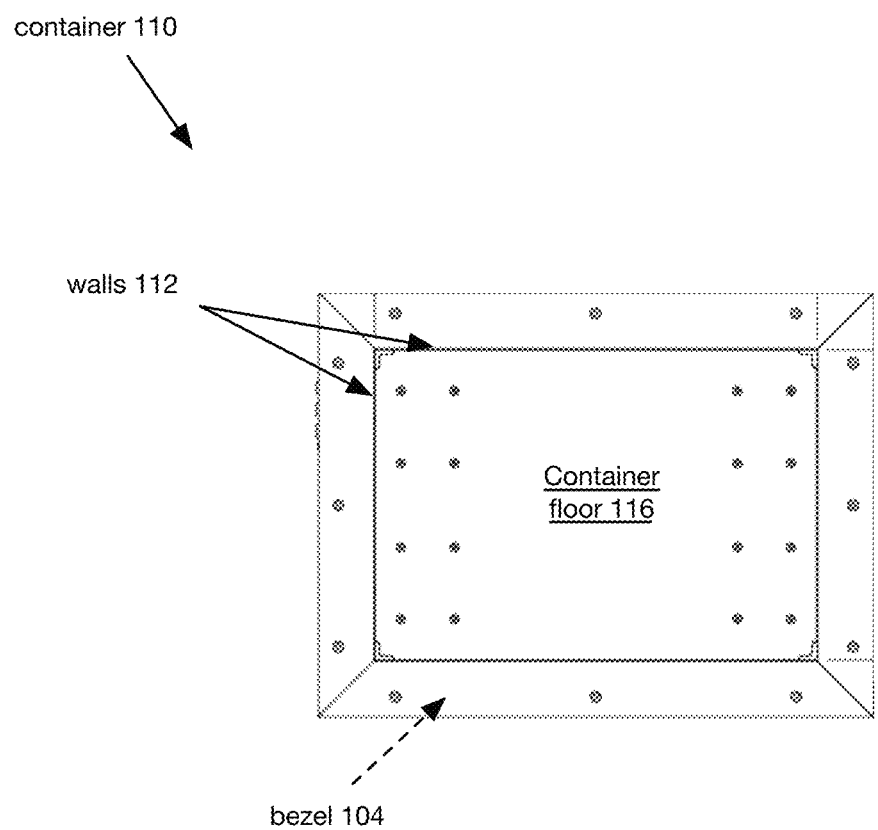
Figure 7:
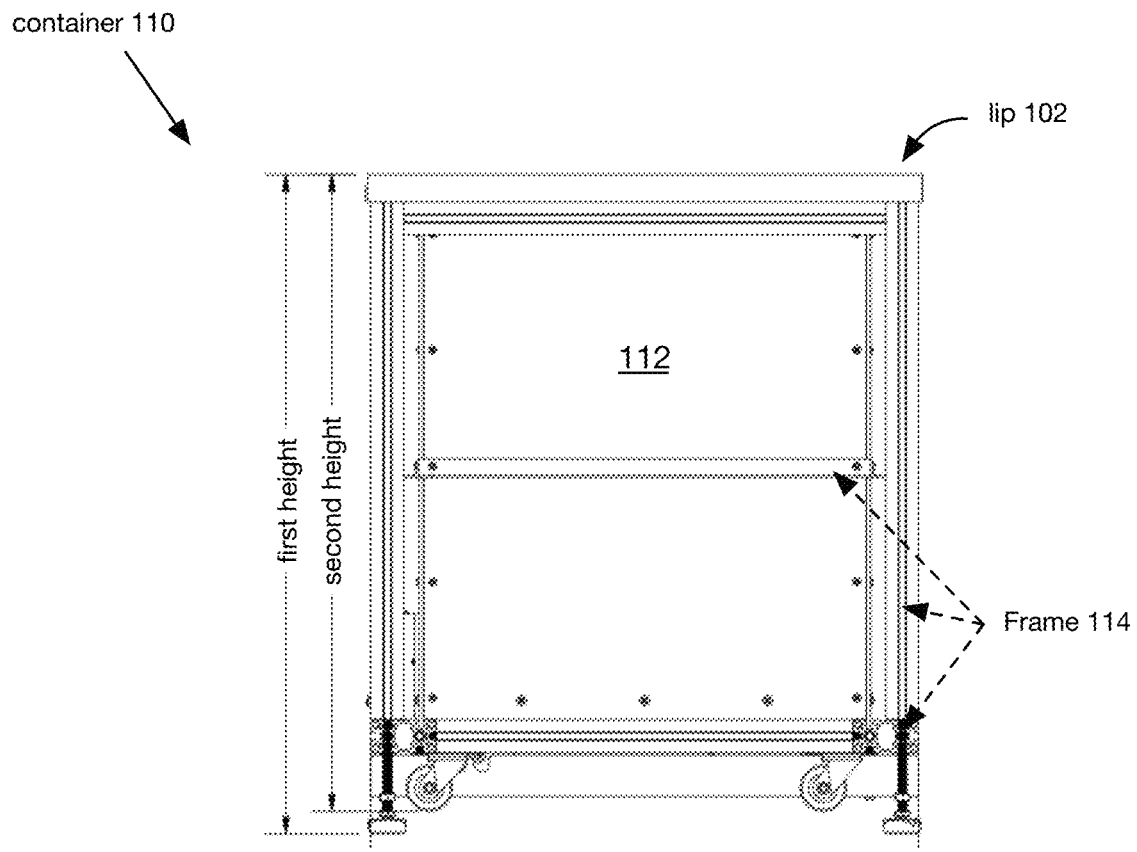
Figure 8:
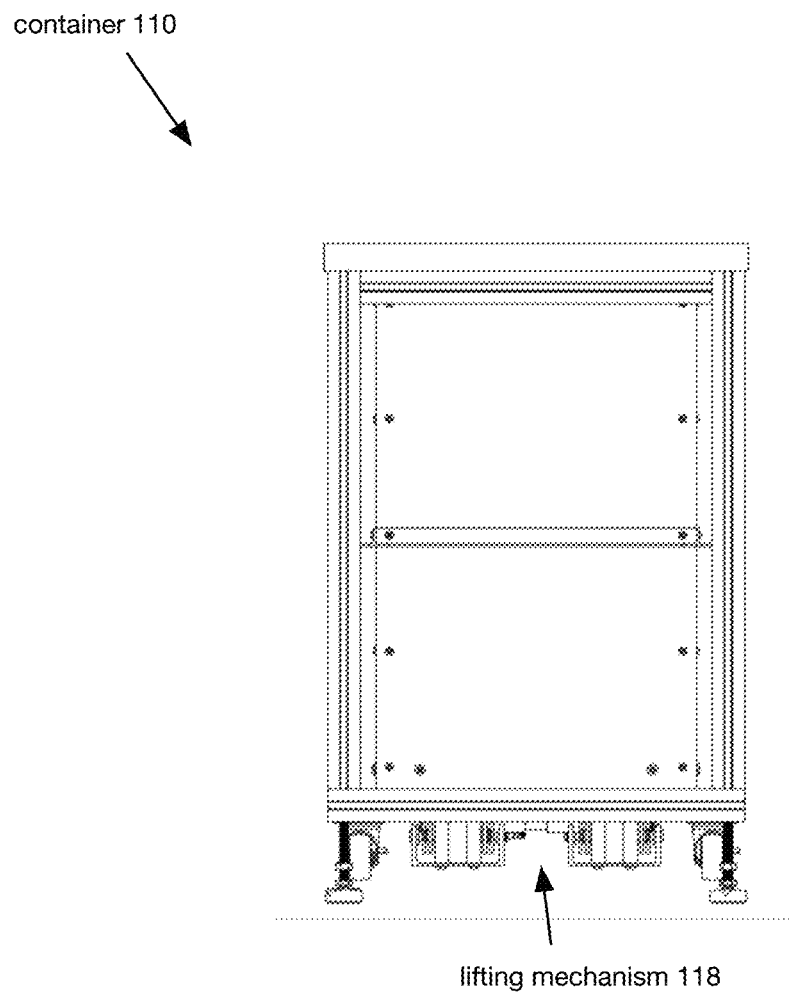

The container can additionally define a working depth (e.g., the variable depth from the top of the container to the container floor) and an absolute depth (e.g., the static depth of the container when the container floor is in a bottom position). The container dimensions can be the container interior dimensions, exterior dimensions, and/or any other dimensions. Examples of the container are depicted in FIGS. 6-8.

The container can define one or more openings (e.g., parallel to the floor, perpendicular to the floor). In an example: the container can define a single opening at a cavity which extends from a lip, at the top of the walls, and terminates at the container floor, spanning the full working depth. The container and/or components thereof (e.g., walls, floor, frame, bezel, etc.) can be plastic, metal, wood, and/or any other material. The container is preferably rigid and/or non-deformable, but can additionally or alternatively flex and/or bow under operating loads (e.g., within a threshold deviation, such as less than 5 mm). However, the container can be otherwise formed.

Set of walls 112 of the container preferably function to (laterally) retain and/or house objects within the container. The walls are preferably static, having an absolute height (or absolute depth) which is invariant with fullness level and/or working depth of the container. The walls collectively enclose a hollow interior volume which extends between a lower end (base) and an upper end (lip) of the walls. The top end of the interior volume is preferably unenclosed, forming a lip at the topmost portion of the walls which encircles the interior, but can additionally or alternatively be selectively closed (e.g., by a lid). The bottom end of the interior volume can be unenclosed or enclosed, such as by a frame, base of the lifting mechanism, and/or bottom closeout. Between the top and bottom ends, the cross section of the interior volume is preferably uniform (e.g., within a threshold deviation) along a vertical axis and/or actuation axis of the lifting mechanism, however the cross section can additionally or alternatively widen and/or narrow proximal the lip. In variants, the cross section of the interior volume is uniform across a range heights spanning the actuation range of the lifting mechanism. In a first example, the cross section can be prismatic, such as formed by a polygonal interior cross-sectional profile (e.g., square, rectangular, hexagonal). In a second example the cross section can be cylindrical and/or tubular, such as formed by a circular interior cross-sectional profile. However, the cross-section can alternatively vary along the height of the walls (e.g., bow due to outward pressure resulting from objects within the container).

Figure 11:
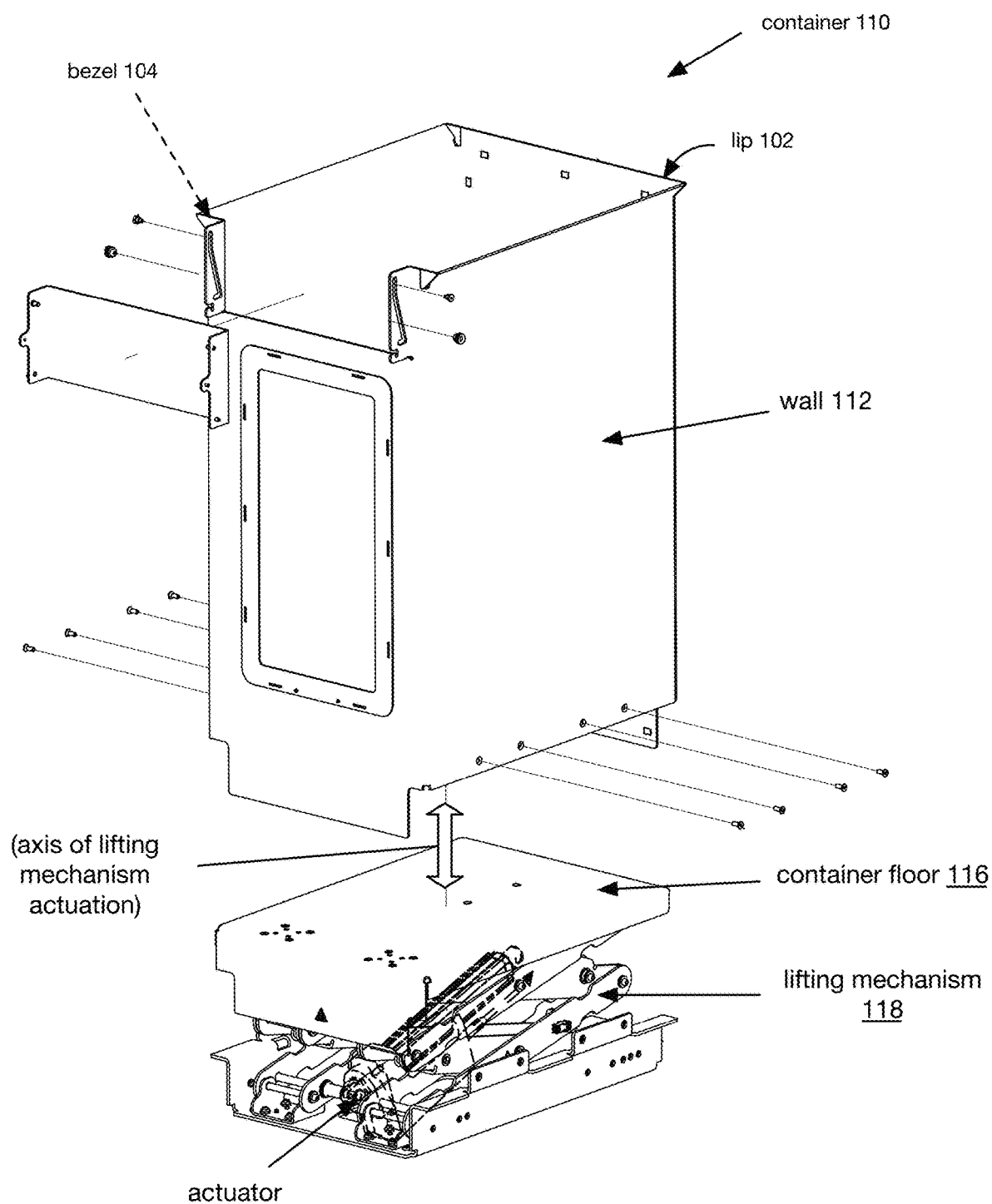
FIG. 11 is an exploded assembly of a variant of a container.

The container can optionally include a bezel (e.g., at the lip of the upper end of the walls, at the rim of the container opening) or not include the bezel. The bezel preferably slopes inward, but can alternatively be planar or slope outward. The cross section of the bezel is preferably a similar polygon (e.g., similar rectangle) relative to the cross section of the walls and/or remainder of the container interior (e.g., of greater area), but can alternatively have a dissimilar shape and/or have any other suitable cross section. The bezel preferably extends along the container opening perimeter, but can extend along a portion of the perimeter. The bezel can be mounted to the walls and/or frame, or otherwise integrated into the walls (an example is shown in FIG. 11). The slope angle of the bezel (e.g., angle relative to a horizontal plane and/or relative to a plane orthogonal to the actuation axis of the lift mechanism) can be predetermined (e.g., 20 degrees, 30 degrees, 45 degrees, 60 degrees, 70 degrees, etc.), selected based on an object angle of repose, and/or any other suitable angle. The width of the bezel can be: greater than an object characteristic length, greater than a maximum object dimension, greater than half of the largest object dimension, and/or any other suitable width. Additionally or alternatively, the width of the bezel can span a combined thickness of the walls and/or frame (e.g., the bezel extend up to a maximal projected footprint of the container; the width of the bezel can be 585.0 mm in a first dimension and 755.0 mm in a second dimension; etc.) or beyond the walls/frame (e.g., the bezel can define the projected footprint of the container).

In some variants, the system may be configured to allow a human to act in place of the robot (e.g., in a failed state of a robot) and manually pick out of the container. In such cases, it can be advantageous for the maximum height of the container (e.g., max height, height of the lip, height of max object, top of floor, etc.) to be within a threshold distance of a standard work-surface height (e.g., 36 inches, 38 inches, standing work surface height, etc.; within 5 mm, within 10 mm, within 20 mm, etc.; first height to base of feet/levels can be 909.6 mm, second height to base of casters can be 878.4 mm, etc.). In such instances, the system can be configured such that the outer periphery of the bezel sits flush with a work surface and/or platform of the robot (e.g., at work surface height). Alternatively, the bezel can be raised above a platform of the robot, recessed below a platform of the robot, and/or otherwise offset from a work surface platform and/or robot mounting structure.

The container can optionally include a frame which functions to structurally support the wall(s) and/or lifting mechanism. In a first variant, the walls can be mounted to the frame at a plurality of mounting points at the upper end (e.g., proximal to the lip), lower end (e.g., proximal to the base), and/or any other intervening points along the height of the walls. The walls are preferably mounted along the edges (e.g., for polygonal cross sections of the container interior), but can be otherwise suitably connected to the frame. The frame can optionally include braces connected to and encircling the walls at the upper end, lower end, and/or mid-section, which can function to avoid bowing/buckling of the walls (e.g., when under load).

In a first variant, the frame can be structurally integrated into the walls (e.g., monocoque, "stressed skin", transferring load through the walls, etc.). In a second variant, the walls can be mounted to an exterior frame.

The frame can optionally mount a set of casters (e.g., rolling, lockable, etc.), which may function to allow manual (rolling) transport of the container and/or objects therein in a manufacturing setting. There can be a pair of casters, three casters, four casters (e.g., one arranged at each corner of a rectangular cross section container), and/or any other suitable number of casters. In variants, casters can allow a single operator to transport an object payload (e.g., 150 lbs) within the container which exceeds a one-man-lift threshold (e.g., 50 lbs). In variants, the maximum object payload of the container can be less than 10 lbs, 10 lbs, 25 lbs, 50 lbs, 75 lbs, 100 lbs, 120 lbs, 150 lbs, 200 lbs, 500 lbs, 1000 lbs, greater than 1000 lbs, any region bounded by the aforementioned values, and/or any other suitable maximum payload.

The frame can optionally include a set of feet (e.g., leveling mounts/feet, standoffs, rubberized feet, etc.), which functions to vertically orient the actuation axis of the lift mechanism and/or level the lip/bezel of the container (e.g., relative to a work surface, relative to a robot platform). In variants, the feet can be selectively deployed and/or adjusted (e.g., manually and/or automatically, such as by electronic actuation), which may function to transfer load off casters and/or raise the casters off of the ground.

However, the container can otherwise exclude casters and/or feet, and the container may otherwise be supported by skids (e.g., configured to be raised and transported using a pallet jack), fixed in place and/or integrated into a superstructure, and/or otherwise configured.

The container floor functions to (vertically) retain objects within the working depth of the container. The container floor and the upper surface thereof is preferably flat (e.g., having a surface normal aligned with the axis of actuation and/or a vertical direction), but can additionally or alternatively be convex, concave, arcuate, monoclastic, anticlastic, and or have any other suitable geometry. The container floor is preferably actuatable and/or configurable between a set of positions (e.g., continuous range or discrete set of positions) between a bottommost position and a topmost position, but can additionally or alternatively be static/lockable, or otherwise suitably configured.

The periphery of the container floor can be flush with the container walls, be separated by a predetermined distance (e.g., gap; based on the object size, be a standard distance), be sealed against the walls (e.g., by stripping), travel along a tongue or groove in the wall, or otherwise interface with the walls. In a specific example, the separation between the container floor and the walls defines an offset which is smaller than a smallest object dimension (e.g., less than half of an object width; less than 100 cm, 10 cm, 5 cm, 1 cm, 5 mm, 1 mm, 0.5 mm, etc.) and/or which provides greater than a threshold clearance (e.g., based on a manufacturing tolerance of the walls, such as a predetermined a flatness threshold; based on a maximum deflection of the walls under load; greater than 0.5 mm, greater than 1 mm, etc.). In a second example, the container floor can include a deformable seal which contacts the sides (e.g., circumferentially, along an entire periphery of the container floor) and/or is configured to engage the walls of the container with an interference. Examples of the container floor are depicted in FIG. 3 and FIG. 4.

The container floor is preferably mounted to the lifting mechanism (e.g., at a transformable end, but can additionally or alternatively be constrained relative to the walls of the container, frame (e.g., slidably, movably, etc.), a central support (e.g., extending through a thickness of the container floor) and/or can be otherwise suitably mounted. In a first example, a pose of the container floor is fully constrained in 6 degrees of freedom (e.g., under rigid body assumptions) by the lifting mechanism. In a second example, a pose of the container floor is constrained in exactly one degree of freedom (e.g., along the axis of actuation) by the lifting mechanism.

The container floor is preferably arranged entirely within the volume swept by the interior of the walls (e.g., within the volume swept by the uniform cross section), however in variants the container floor can be configured to deploy beyond the interior of the walls, such as vertically above a top-plane of the walls or below a base plane of the walls. In some variants, the container floor can be arranged to outside a workspace of the robot (e.g., below the workspace). In some variants, the container floor can be arranged to within a workspace of the robot (e.g., where the robot may rely on collision avoidance controls). In some variants, the container floor may be arranged between the upper end (lip) and lower end (base) of the walls, such as closer to the lip (e.g., where the working depth is less than half the absolute depth of the container) or closer to the base. Alternatively, the container floor may be arranged below the lower end (base) of the walls, with the upper surface substantially flush with a base plane of the walls, or with a (vertical) thickness of the container floor spanning a base plane at the lower end of the walls.

In variants, a characteristic dimension of the container floor (e.g., length, width, diagonal, diameter, etc.) can be smaller than the working depth of the container. In a specific example an area of the container floor is 610 mm x 430 mm and the working depth can be greater than 610 mm (e.g., greater than 700 mm, 735 mm, greater than 750 mm, etc.). However, the container floor can have any other suitable dimensions However, the container floor can additionally or alternatively include any other suitable components.

The container can include a lifting mechanism 118, which can function to actuate the container floor to control the working depth of the container (e.g., transform the position of the container floor). The lifting mechanism preferably includes at a fixed end which is mounted to a rigid and/or static portion of the container (e.g., walls and/or frame) and a transformable end which is connected to the container floor, and which is configured to actuate the container floor along an actuation axis (e.g., lifting axis; in a vertical direction; etc.).

The lifting mechanism is preferably positioned beneath the container floor (e.g., entirely or partially within a vertically projected area/footprint of the container floor) but can additionally or alternatively be positioned to the side of the container floor, within the container, outside of the container, or otherwise positioned. The lifting mechanism can be integrated into the container, such as mounted to the frame and/or walls, or can be separate (e.g., arranged along the floor or at a container reference/mounting position). The container floor is preferably actuated from below and connects to the lifting mechanism at a lower surface (e.g., opposite the lower surface), but can additionally or alternatively be actuated from the sides or top, and/or can be centrally actuated (e.g., by an actuation mechanism extending through a thickness of the container floor.

Figure 12:
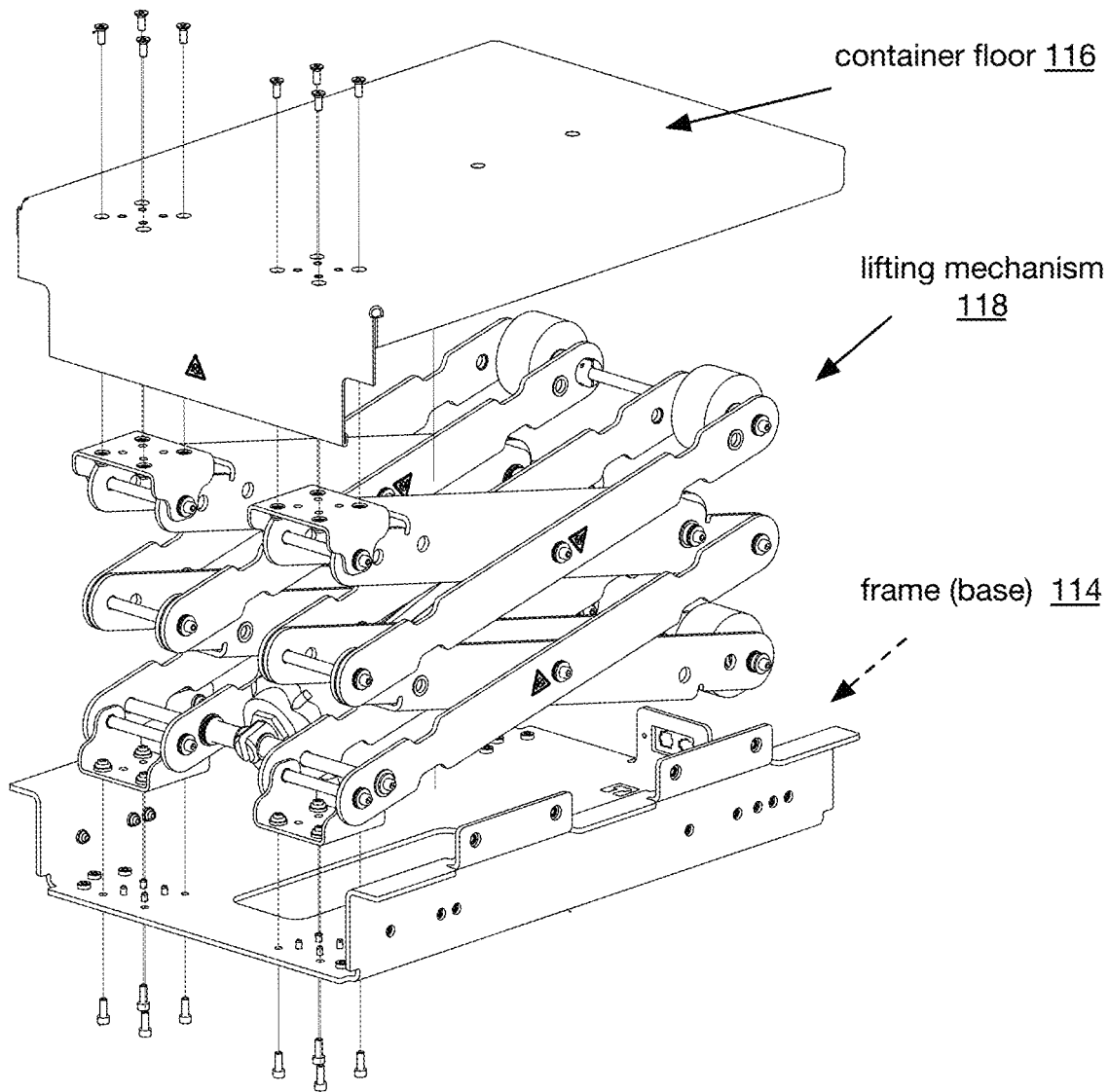
FIG. 12 an example exploded assembly view of a lifting mechanism for a variant of a container.

The lifting mechanism can include a variable length actuation mechanism (e.g., along the actuation axis), such as a scissor lift, piston cylinder (e.g., pneumatic, hydraulic), retractable siding material (e.g., a material extending a full length of the working depth translates upwards and/or retracts), linkage, and/or other actuation mechanism(s). In a specific example, the lifting mechanism includes a scissor jack which is connected to the frame at a fixed mounting point (e.g., beneath the container floor, an example is shown in FIG. 12), where lift action occurs by increasing a distance between the mounting point and the container floor. In a second specific example, the lifting mechanism can be a hoist mounted to the frame (and/or sidewalls) above the container floor, where lift action occurs by decreasing a distance between the mounting point and the container floor (e.g., decreasing the length of the actuation mechanism). Additionally or alternatively, the lifting mechanism can include a fixed length actuation mechanism (e.g., along the actuation axis), such as a ball screw, lead screw, drive chain/pulley mechanism, and/or other suitable fixed-length actuation mechanism.

In variants, the container can include multiple lifting mechanisms (and/or multiple actuation elements), the lifting mechanisms are preferably equally distributed along the actuatable container surface (e.g., on opposing sides, symmetrically distributed), but can be unevenly distributed relative to the container surface (e.g., on the same side).

The lifting mechanism is preferably driven by electromechanical actuation (e.g., motor, servo, etc.), but can additionally or alternatively be driven by hydraulic, pneumatic, and/or any other suitable actuator(s). Actuators can be rotational or linear. The actuation can be uni-directional (e.g., only actuated in the lifting direction) or bi-directional. In an example, the lifting mechanism can be used with a passive retraction mechanism (e.g., based on weighted/gravitational retraction; using a passive return spring, etc.). The actuation mechanism can be backdrivable or non-backdrivable (e.g., passively stable, such as without continuous power consumption or during a power-loss event). The actuation mechanism can be non-backdrivable in both directions (e.g., worm drive) or a single direction (e.g., ratcheting during lifting). The lifting mechanism preferably utilizes the same drive mechanism in the upwards (e.g., raising/lifting) and downwards (e.g., lowering) directions, or can rely on separate actuation types/mechanisms (e.g., such as manual lowering).

An example of the lifting mechanism is depicted in FIG. 4. However, the lifting mechanism can additionally or alternatively include any other suitable components.

Figure 13:
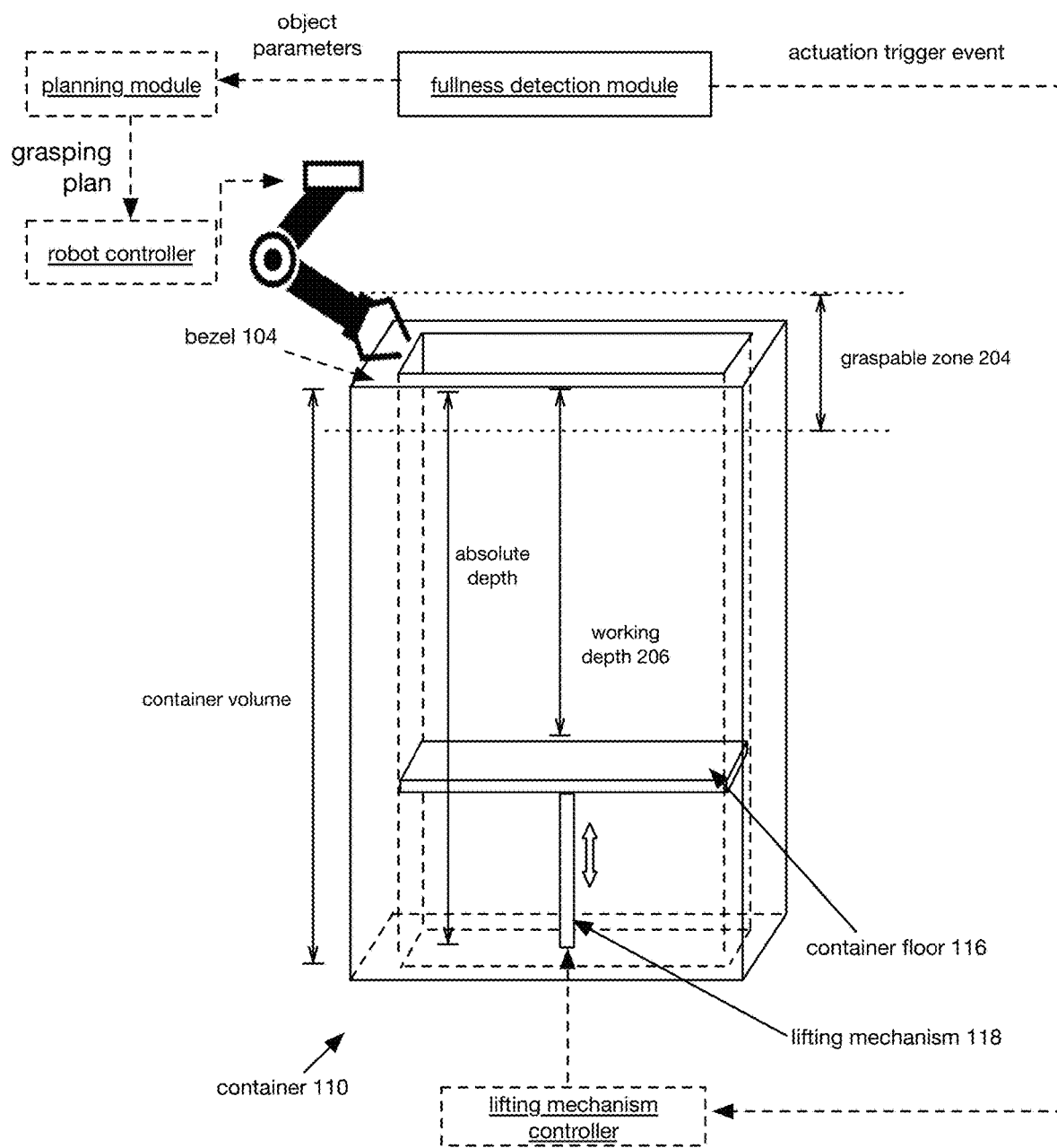
FIG. 13 is an example of one variant of the system.

The actuator(s) of the lifting mechanism can be controlled: using a system including the fullness detection module (e.g., actuated when objects are not within the graspable zone, an example is shown in FIG. 13), the robot end effector (e.g., actuated when the robot end effector fails to retain an object), or otherwise controlled. Actuator operation can be controlled by a local computing system, a remote computing system, or another system. The actuators of the lifting mechanism can be controlled using a closed-loop control scheme for actuator position (e.g., relying on positional feedback sensing for the topmost object, container floor height, and/or actuator position), an open loop control scheme for actuator position (e.g., relying on various hardware and software triggers or end conditions), or otherwise suitably controlled. The actuators of the lift mechanism can be connected to a power source onboard the container (e.g., battery), a power source common to the robot (e.g., a single wall power connection), a separate power source from the robot (e.g., a pressurized pneumatic hose), and/or any other suitable power source(s). The actuators are preferably communicatively connected to the controller and/or are regulated/controlled by the controller (e.g., in a wired/wireless manner), but can be otherwise manually controlled and/or otherwise operated. However, the actuator(s) of the lift mechanism can be otherwise suitably controlled.

However, the system can include any other suitable lift mechanism

The system can include multiple containers (e.g., per robot, per conveyor, etc.). The containers can be arranged next to the robot, next to the conveyor a predetermined distance from the robot (e.g., such that the robot can pick from the containers), and/or otherwise arranged (e.g., as depicted in FIGS. 9-10). In variants, containers can be secured, retained, and/or connected to a base platform of the robot or superstructure of the robot, which can ensure repeatable positioning relative to a robot reference frame (e.g., in a predetermined position relative to the sensor coordinate system, etc.). Alternatively, the container can be mechanically decoupled from the robot, and the position of the container determined by sensor-driven means (e.g., imaging and computer vision, etc.).

In variants, the container can include a pattern on the container interior (e.g., walls, floor), bezel, exterior, and/or any other location, which can function to enable sensor calibration and/or improved feature detection and extraction, but can additionally or alternatively provide any other functionality. The container can include a matte finish, a flat finish, and/or any other suitable finish.

However, the container can additionally or alternatively include any other suitable components.

The system can include a set of sensors 120, which can function to determine the fullness level of the container and/or whether objects are within the graspable zone. Additionally or alternatively, sensors can be used for control of the robotic arm and/or lifting mechanism.

The sensors can include fullness detection sensors (e.g., a.k.a. object sensors) which functions to detect the presence of objects within the working volume of the container to determine a fullness of the container. The fullness detection sensor measurements can optionally be used to determine a grasp location and/or otherwise used. Object sensors can include: one or more cameras (e.g., 3D scanner, projected light, stereo camera, CMOS, CCD), depth sensors, lasers, through beam light curtains, weight sensors, height interrupt sensors (e.g., break beam sensors, light curtain sensors, etc.), and/or any other suitable sensors. In a specific example, height interrupt sensors can be configured to detect an interrupted light state of a transmitter-receiver pair which is arranged in a horizontal plane (e.g., orthogonal plane to the actuation axis of the floor). The fullness detection sensors can be positioned a predetermined distance above the container (e.g., 1-10 cm, 50-100 cm, less than 200 cm, less than 300 cm, etc.), integrated into the container (e.g., in one or more walls of the container, in the bezel, etc., such as to define one or more boundaries of the graspable zone), and/or otherwise positioned relative to the container. When sensors are positioned above the container, the sensor(s) can be centered over the container, positioned to the side of the container (e.g., so that the robot does not hit the sensor), and/or otherwise positioned above the container.

In a first example, the fullness detection module includes a light curtain extending across the bottom plane of the graspable zone, wherein the lift mechanism is actuated in response to light curtain beam detection (e.g., the light curtain beams are no longer broken by intervening objects). In a second example, the fullness detection module includes a top-down depth sensor that determines the depth of the topmost object(s) within the container (e.g., a single object's depth, the average depth of the top objects, etc.), and actuates the lift mechanism in response to the depth exceeding a threshold depth (e.g., graspable zone bottom).

For example, the fullness detection sensors can be used to determine: whether the an object breaks a plane of the graspable zone (e.g., bottom plane, top plane, etc.), whether the object depth is within or outside of the graspable zone, and/or otherwise determine object position relative to the graspable zone. The fullness detection module can optionally determine the container position relative to the robot and/or conveyor, object poses relative to the robot, a sensor, any other component, and/or provide any other functionality.

The sensors can additionally include lift mechanism feedback sensors, which functions to determine a position of the lifting mechanism. In variants, the position of the lift mechanism can be used for actuator control of the lifting mechanism (e.g., in a closed-loop manner) and/or to approximate an amount of objects in the container (e.g., based on a change in the working volume of the container). Lift mechanism feedback sensors include absolute sensors (e.g., absolute encoder, resolver, etc.), incremental sensors (e.g., incremental encoder), rotational sensors, linear sensors, time of flight sensors (e.g., laser rangefinding, proximity sensors, acoustic sensors, etc.), limit switches, joint pose sensors (e.g., integrated into a revolute joint of a linkage, such as a scissor jack), and/or any other suitable sensor. Alternatively, the system can lack a lift mechanism feedback sensor. Lift mechanism feedback sensors are preferably arranged below the container floor, but can additionally or alternatively be integrated into the container floor and/or otherwise arranged. Lift mechanism feedback sensors can be mounted to the base of the frame, container floor (e.g., directed toward a base of the frame), within a revolute joint of an actuation mechanism, and/or can be otherwise suitably mounted. The sensors can additionally include robot sensors (e.g., integrated into a robotic arm, end effector, and/or axis of the robot, which can function to enable control of the robot.

The system can include a controller (e.g., local and/or remote) that functions to control actuation of the robot and/or lifting mechanism, which can enable robotic picking (e.g., grasping) and placing, container floor adjustment, fullness detection operation, and/or any other operations. Additionally or alternatively, the controller can function to execute all or a portion of the method S100. The controller can be unitary (e.g., a single controller for the robot and the lifting mechanism) or distributed (e.g., separate computer systems for the container and the robot). The controller is preferably communicatively connected to each of the set of sensors, lift mechanism, and robot via a wired and/or wireless connections.

However, the system can additionally or alternatively include any other suitable elements.

5. Method

The method for monitoring a container fullness preferably includes: picking objects out of a container S100, detecting an actuation trigger event S200, raising the container floor until the fullness level is above a second threshold S300, and detecting a container fill event S400, but can additionally or alternatively include filling the container S500, and/or any other suitable elements.

The method is preferably performed by the system, but can additionally or alternatively be performed by any other suitable system.

All or a portion of the method can be repeated until: a stop condition is met, periodically, after an object has been picked, after an object has been placed, and/or at any other suitable time. The stop condition can be: a container fill event (e.g., less than a threshold volume of objects are left in the container, container floor is above a threshold height, etc.), human ingress into the workspace, timer expiration, and/or any other suitable condition. Different instances of the method can be performed: concurrently, contemporaneously, serially, and/or with any suitable relationship.

5.1 Picking Objects Out of a Container S100.

Picking objects out of a container S100 can function to pick objects out of the container for object placement. Objects can be picked by the robot, by a human, and/or by any other entity. S100 can include: sampling an image of the objects in the container, determining object parameters based on the image, selecting an object to grasp based on the object parameters, planning a path to the object based on the object parameters, and controlling the robot end effector to grasp the object according to the path. S100 can optionally determine object population-level parameters, such as average depth, number of objects within the graspable zone, and/or other parameters based on the image.

In variants, picking objects out of the container can be performed using the system and/or method as described in U.S. application Ser. No. 17/375,424, titled "METHOD AND SYSTEM FOR OBJECT GRASPING", filed 14 Jul. 2021, which is incorporated herein in its entirety by this reference.

In variants, picking object out of the container can be performed using the system and/or (runtime) method as described in U.S. application Ser. No. 17/375,798, titled "METHOD AND SYSTEM FOR GRASPING AN OBJECT", filed 14 Jul. 2021, which is incorporated herein in its entirety by this reference.

In an example, picking objects out of the container can include: sampling an image depicting a pile of objects within the container; determining a set of object parameters for each object within the image; selecting a candidate object to grasp based on the set of object parameters; and controlling a robot arm to grasp the candidate object.

However, S100 can be otherwise performed.

5.2 Detecting an Actuation Trigger Event S200.

Detecting an actuation trigger event S200 functions to determine that the height of the topmost object within the container working volume and/or overall object level within the container should be raised. S200 can be performed: repeatedly, immediately after the system picks an object, while the system performs a prior object pick (e.g., grasp) and placement, periodically (e.g., every second, every 5 seconds, 10 seconds, 30 seconds, 1 minute, 2 minutes, 3 minutes, etc.), concurrently with S100, concurrently with object parameter extraction from the image, and/or performed at any other suitable time.

The actuation trigger event is preferably determination that the fullness level is below a first threshold (e.g., the bottom of the graspable zone, a threshold higher or lower than the graspable zone bottom, etc.; a height condition), but can alternatively include: a total object weight change, since the last actuation, exceeding a predetermined threshold (e.g., a height condition); a threshold number of objects removed from the container since the last actuation; determination that less than a threshold number of objects are within the graspable zone (e.g., graspable objects, total objects, etc.); and/or another event.

In a first variant, S200 is performed using visual measurements from the container fullness sensors, such as from the one or more camera sensors and/or the one or more depth sensors. The visual measurements can include a depth measurement (e.g., to determine the average depth measurement representing the average fullness level), an image frame (e.g., to determine a fullness level using heuristics, algorithms, etc.), and/or any other suitable measurement. The image can be the image used to determine which object to pick (e.g., performed in S100), or can be a different image.

In a second variant, S200 includes determining that no objects are triggering one or more lasers of a set of lasers or a light curtain.

In a third variant, the system can determine and/or receive a notification that represents no graspable objects (e.g., a set of graspable objects is empty) or that there are no grasp points which exceed a graspability score threshold, such as determined using the graspability network as described in U.S. application Ser. No. 17/375,798, titled "METHOD AND SYSTEM FOR GRASPING AN OBJECT", filed 14 Jul. 2021, which is incorporated herein in its entirety by this reference.

However, detecting that the fullness level is below the first threshold can additionally or alternatively include any other suitable elements performed in any other suitable manner.

5.3 Transforming the Container Floor S300.

Transforming the container floor S300 can function to raise and/or lower the container floor along the actuation axis of the lifting mechanism. In variants, S300 can be performed until the fullness level is within the graspable zone (e.g., to push objects into the graspable zone, above the graspable zone, enable objects to fall back into the graspable zone, such as to not push the objects out of the container, etc.).

Actuating the container is preferably performed automatically using the lifting mechanism (e.g., actuating a transformable end of the lifting mechanism) of the system to actuate the container floor, but can alternatively be passively actuated (e.g., using a sprung floor), manually performed by an operator, and/or otherwise actuated.

The container floor is preferably actuated in response to detection of an actuation trigger event S200 (e.g., in response to satisfaction of a minimum fullness threshold of the container; in response to an object level falling below a threshold height; etc.), but can additionally or alternatively be actuated after a predetermined number of objects are picked from the container (e.g., to maintain a consistent fullness level throughout an operation session), actuated after an object falls out of a container (e.g., lower the container floor so that the container does not overflow), and/or actuated at any other suitable time.

The container floor can be actuated while the system is planning and/or performing an object pick (e.g., as described in S100), after the object has been picked (e.g., and is being placed, such that the robot is not accessing the container), and/or actuated at any other time.

The container floor can be actuated until a termination event occurs. The termination event can include: a predetermined actuation distance (e.g., a predetermined height increase; a predetermined number of motor rotations, etc.; determined using the lift mechanism feedback sensors); the object level (fullness level) exceeding a second threshold (e.g., higher than, equal to, or lower than the first threshold used in S200), as determined based on the fullness detection module; the fullness level intersecting the graspable zone; after the container floor is lowered a predetermined amount after a container is determined to be overfilled (e.g., 1 cm, 2 cm, 3 cm, etc.); after a predetermined actuation time has lapsed (e.g., for a fixed-time actuation step); the container floor being arranged at a maximal vertical position (e.g., when no candidate objects are selected—which may be used to detect that the container is empty; hitting a limit switch; etc.); and/or another stop event.

Preferably, the container floor (and/or the objects therein) is raised monotonically (e.g., for a height evaluated continuously, for a height evaluated at sequential picks, etc.) by the lifting mechanism during one or more periods of operation, such as: for the period between detection of the actuation trigger event and detection of the termination event, for a period between consecutive object picks, for a period between a fill event and a refill event trigger, and/or any other suitable operating period. In an example, a quantity of objects within the container monotonically decreases across a picking period (e.g., which spans picking a first set of objects out of the container, raising the container, and picking a second set of objects out of the container). Likewise, in variants the working depth of the container can monotonically decrease across a picking period. However, in some variants, the container floor can optionally be lowered after a container is determined to be overfilled (e.g., the fullness level is a predetermined amount above the second threshold and/or above the graspable zone). The container can be overfilled when an object is pushed over the edge of the container, when more than a predetermined number of objects are located on the bezel of the container, and/or when the fullness level is at any other position relative to the container. In variants, the container floor can be lowered and/or picking from the container (e.g., a picking period; picking while monotonically raising the container floor; etc.) can cease in response to detecting a stop condition (e.g., detecting a container fill event, power cessation, emergency stop button input, etc.). In an example, the actuatable floor can be monotonically raised until a stop condition is met. However, the container floor can be otherwise actuated.

In a first variant, a depth sensor can be used to determine the termination event. For example, the container floor can be actuated until the fullness level, as determined by the depth sensor, is within the graspable zone.

In a second variant, one or more lasers and/or a light screen can be used to determine the fullness level. The lasers/light screen can be the same as that used in S200, or be different (e.g., arranged above those used in S100). The container floor can be actuated until the one or more sensors are triggered (e.g., the projected beam is interrupted), indicating the fullness level is above the threshold defined by the sensors.

In a third variant, the system can determine that no possible object grasps are available (e.g., in S100). When no object grasps are possible, the container floor can be raised until one or more objects are graspable.

However, actuating the container floor can additionally or alternatively include any other suitable elements performed in any other suitable manner.

5.4 Detecting a Container Fill Event S400.

Detecting a container fill event S400 can function to determine when to fill or refill the container. The container fill event can include: an empty container, lack of graspable objects, floor arrangement in a predetermined position, and/or any other suitable event.

In a first variant, a container fill event can be detected by determining that there are no objects in an image of the container (e.g., captured by one or more cameras).

In a second variant, a container fill event can be detected based on the container floor position (e.g., floor arrangement in its topmost/maximal vertical position, a position within a predetermined distance from the topmost position, etc.).

In a third variant, the container fill event can be detected when the system determines that no objects remaining in the container are graspable and the container floor is at the topmost position.

Detecting a container fill event can include notifying one or more management entities of the container state (e.g., visual display at the system, sending a message to an entity device, etc.), moving the container to a fill station, moving the robot to a filled container, replacing the empty container with a full container and/or other response to container fill event detection.

However, detecting a container fill event can additionally or alternatively include any other suitable elements performed in any other suitable manner.

5.5 Filling the Container S500.

Filling the container S500 can function to fill the container with objects. Filling the container is preferably performed before an operation session, after a container fill event is detected S400, and/or at any other time.

S500 can include: lowering the container floor (e.g., to its lowest position by actuating the container floor; compressing the lifting mechanism using the object weight, etc.); filling the container (e.g., manually; automatically with a funnel, auger, conveyor, etc.); and optionally notifying a system (e.g., the robot) that the filled container is available for use.

In variants, filling the container can be performed in-situ (e.g., with the walls and/or frame of the container remaining in place).

In variants, filling the container can include removing the container and/or transporting the container (e.g., away from the robot) to a refilling location (distal to the robot). The container can be transported manually, such as by rolling the container away from the robot using casters (e.g., connected to the frame) or a pallet jack, or automatically, such as using a conveyor system. In an example, S500 can include any of: deploying/engaging a set of casters (e.g., by retracting a set of leveling feet), disconnecting a physical retention connecting the container to a mounting platform of the robot (e.g., manually, automatically, etc.), electrically decoupling the lifting mechanism from a power source, communicatively decoupling sensors integrated into the container (e.g., lift mechanism feedback sensors, height trigger sensor, etc.) from the controller.

In variants, during filling and/or container removal, the robot can continue picking objects (e.g., according to S100) from a secondary container which is also adjacent to the robot, such as arranged on an opposing side of a robot mounting platform relative to the container with the detected refill event, or can otherwise continue performing operations during refilling (e.g., object placement, etc.). In such case, the controller can employ various risk mitigation measures such as: slowing an operating speed of the arm (e.g., motions reduced to less than 50% of a nominal operation speed), restricting a motion of the arm to within a subregion of the workspace (e.g., subregion defined by light curtain separating the container being refilled from the secondary container, where the robot is disabled in response to the light curtain being broken; software restriction of the available joint space of a robotic arm; etc.); disabling the arm in response to detection of a kill switch input; and/or any other suitable risk mitigation measures. In variants, the container may be removed with a removal mechanism, such as an extended tether or arm which extends beyond the workspace of the robot, allowing a human to remove the container without a human entering the workspace. However, the robot can alternatively be disabled during refilling, and/or the system can provide any other suitable risk mitigation measures.

After the container is filled, the system can verify that the container is filled using the fullness detection sensors (e.g., depth sensor, camera, light screen, lasers, etc.), a weight sensor (e.g., connected to the container floor), and/or any other sensor.

After the container is filled, the method can be repeated using the filled container. In a first embodiment, the system can begin picking objects from the container (e.g., as described in S100). In a second embodiment, after the system determines a different container fill event for a different container, the system can begin picking from the original container (e.g., as described in S100). However, filling the container can additionally or alternatively include any other suitable elements performed in any other suitable manner.

Alternative embodiments implement the above methods and/or processing modules in non-transitory computer-readable media, storing computer-readable instructions. The instructions can be executed by computer-executable components integrated with the computer-readable medium and/or processing system. The computer-readable medium may include any suitable computer readable media such as RAMs, ROMs, flash memory, EEPROMs, optical devices (CD or DVD), hard drives, floppy drives, non-transitory computer readable media, or any suitable device. The computer-executable component can include a computing system and/or processing system (e.g., including one or more collocated or distributed, remote or local processors) connected to the non-transitory computer-readable medium, such as CPUs, GPUs, TPUS, microprocessors, or ASICs, but the instructions can alternatively or additionally be executed by any suitable dedicated hardware device.

Embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

As a person skilled in the art will recognize from the previous detailed description and from the figures and claims, modifications and changes can be made to the preferred embodiments of the invention without departing from the scope of this invention defined in the following claims.

I claim:

1. A method for robotic picking, comprising:
   using a multi-axis robot, picking a first set of objects out of a container, the container comprising a set of walls and a container floor defining a working depth relative to a lip of the set of walls;
   determining satisfaction of a minimum fullness threshold of the container; and
   responsive to a satisfaction of the minimum fullness threshold of the container, transforming the container floor relative to the set of walls using a lift mechanism to modify the working depth.

2. The method of claim 1, further comprising:
   using the multi-axis robot, picking a second set of objects out of the container while the container floor is at the modified working depth.

3. The method of claim 1, wherein a quantity of objects within the container monotonically decreases across a picking period which spans picking the first and second sets of objects out of the container.

4. The method of claim 3, wherein the working depth for successive picks is monotonically decreasing during the picking period.

5. The method of claim 1, further comprising:
   during motion of the multi-axis robot, refilling the container in-situ with a plurality of objects.

6. The method of claim 5, wherein refilling the container in-situ comprises:
   using the lifting mechanism, transforming the container floor beyond a workspace of the multi-axis robot.

7. A non-transitory computer storage medium encoded with a computer program, the program comprising instructions that are operable, when executed by data processing apparatus, to cause the data processing apparatus to perform operations comprising:
   using a multi-axis robot, picking a first set of objects out of a container, the container comprising a set of walls and a container floor defining a working depth relative to a lip of the set of walls;
   determining satisfaction of a minimum fullness threshold of the container; and responsive to a satisfaction of the minimum fullness threshold of the container, transforming the container floor relative to the set of walls using a lift mechanism to modify the working depth.

8. The non-transitory computer storage medium of claim 7, wherein the operations further comprise:

using the multi-axis robot, picking a second set of objects out of the container while the container floor is at the modified working depth.

9. The non-transitory computer storage medium of claim 7, wherein a quantity of objects within the container monotonically decreases across a picking period which spans picking the first and second sets of objects out of the container.

10. The non-transitory computer storage medium of claim 9, wherein the working depth for successive picks is monotonically decreasing during the picking period.

11. The non-transitory computer storage medium of claim 7, wherein the operations further comprise:

during motion of the multi-axis robot, refilling the container in-situ with a plurality of objects.

12. The non-transitory computer storage medium of claim 11, wherein refilling the container in-situ comprises:

using the lifting mechanism, transforming the container floor beyond a workspace of the multi-axis robot.

13. A system comprising: one or more computers and one or more storage devices storing instructions that are operable, when executed by the one or more computers, to cause the one or more computers to perform operations comprising:

using a multi-axis robot, picking a first set of objects out of a container, the container comprising a set of walls and a container floor defining a working depth relative to a lip of the set of walls;

determining satisfaction of a minimum fullness threshold of the container; and responsive to a satisfaction of the minimum fullness threshold of the container, transforming the container floor relative to the set of walls using a lift mechanism to modify the working depth.

14. The system of claim 13, wherein the operations further comprise:

using the multi-axis robot, picking a second set of objects out of the container while the container floor is at the modified working depth.

15. The system of claim 13, wherein a quantity of objects within the container monotonically decreases across a picking period which spans picking the first and second sets of objects out of the container.

16. The system of claim 15, wherein the working depth for successive picks is monotonically decreasing during the picking period.

17. The system of claim 13, wherein the operations further comprise:

during motion of the multi-axis robot, refilling the container in-situ with a plurality of objects.

18. The system of claim 17, wherein refilling the container in-situ comprises:

using the lifting mechanism, transforming the container floor beyond a workspace of the multi-axis robot.

* * * * *